(12) United States Patent
Kim et al.

(10) Patent No.: US 11,042,465 B1
(45) Date of Patent: Jun. 22, 2021

(54) SYSTEMS AND METHODS FOR ANALYZING APPLICATION LOADING TIMES

(71) Applicant: Coupang Corp., Seoul (KR)

(72) Inventors: Sang Ryul Kim, Sungnam (KR); Ho Han, Seoul (KR); Su Hwan Hwang, Gwangmyeong (KR); Jeong Soo Park, Seoul (KR); Byoung Ho Han, Sungnam (KR); Chun Kwon Park, Yongin (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/010,108

(22) Filed: Sep. 2, 2020

(51) Int. Cl.
G06F 11/36 (2006.01)

(52) U.S. Cl.
CPC .................. *G06F 11/3612* (2013.01)

(58) Field of Classification Search
None
See application file for complete search history.

(56) References Cited

U.S. PATENT DOCUMENTS

| | | | | |
|---|---|---|---|---|
| 6,438,750 B1* | 8/2002 | Anderson | ............. | G06F 9/4406 713/1 |
| 9,923,793 B1* | 3/2018 | Gore | ............. | H04L 67/42 |
| 2005/0216894 A1* | 9/2005 | Igarashi | ............. | G06F 11/3457 717/126 |
| 2011/0099500 A1* | 4/2011 | Smith | ............. | H04L 41/22 715/771 |
| 2012/0023487 A1* | 1/2012 | Letca | ............. | H04L 67/42 717/130 |
| 2013/0125143 A1* | 5/2013 | Kikuchi | ............. | G06F 9/542 719/318 |
| 2014/0149578 A1* | 5/2014 | Goldman | ............. | H04L 45/02 709/224 |
| 2015/0088968 A1* | 3/2015 | Wei | ............. | G06F 16/00 709/203 |
| 2017/0237799 A1* | 8/2017 | Veeravalli | ............. | H04L 67/025 709/224 |
| 2017/0331918 A1* | 11/2017 | Szabo | ............. | H04L 69/164 |
| 2020/0084319 A1* | 3/2020 | Hiwatari | ............. | H04N 1/0009 |
| 2020/0267203 A1* | 8/2020 | Jindal | ............. | H04L 67/025 |

OTHER PUBLICATIONS

Wang, X. S., et al., Demystifying page load performance with WProf, 10th USENIX Symposium on Networked Systems Design and Implementation (NSDI 13), published 2013, pp. 473-485 (13 pages).

Examination Report No. 1 dated Nov. 18, 2020 and issued by Australian Patent Office in a counterpart Australian Application No. 2020264258 (7 pages).

\* cited by examiner

*Primary Examiner* — Qing Chen
(74) *Attorney, Agent, or Firm* — Finnegan, Henderson, Farabow, Garrett & Dunner, L.L.P.

(57) ABSTRACT

A computer-implemented system for determining a loading time by an application in a user device may include a memory storing instructions and at least one processor configured to execute the instructions to perform a process. The process may include detecting a first trigger event and determining a first start time of a loading by a first application in response to the detected first trigger event. The process may also include detecting a second trigger event and determining a first end time of the loading by the first application in response to the detected second trigger event. The process may further include transmitting, via a network, a first log comprising the first start time and the first end time to a server.

19 Claims, 7 Drawing Sheets

SYSTEMS AND METHODS FOR ANALYZING APPLICATION LOADING TIMES

TECHNICAL FIELD

The present disclosure generally relates to computerized systems and methods for evaluating the performance of software applications. In particular, embodiments of the present disclosure relate to automatically determining loading times of applications and evaluating the performance based on the loading times.

BACKGROUND

Electronic devices such as computers, laptops, smartphones, tablet personal-computers, and wearable devices, have now become more and more common as platforms for software applications. Application developers and publishers face significant challenges in testing and deploying applications. For example, it may difficult to evaluate the performance a particular application (or a specific version of an application) given that there are hundreds of, if not thousands of, devices with different hardware configurations, software configuration, operating systems, or a combination thereof. Manually testing of an application on dozens of devices in a testing environment under simulated loads may pose severe limitations because the data could be very limit and good results indicated in these tests may not repeat in the vast majority of other devices.

It may then be desirable to design systems and methods for automatically testing loading speed and performance of applications. It may also be beneficial to developers to present test results in an intuitive way.

SUMMARY

In one aspect of the present disclosure, a computer-implemented system for determining a loading time by an application in a user device is provided. The system may include a memory storing instructions and at least one processor configured to execute the instructions to perform a process. The process may include detecting a first trigger event and determining a first start time of a loading by a first application in response to the detected first trigger event. The process may also include detecting a second trigger event and determining a first end time of the loading by the first application in response to the detected second trigger event. The process may further include transmitting, via a network, a first log comprising the first start time and the first end time to a server.

In some embodiments, the process may also include determining a second start time of a loading by a second application, determining a second end time of a loading by the second application; and transmitting, via the network, a second log comprising the second start time and the second end time to the server. In some embodiments, the process may include determining a second start time of a loading by a second application, determining a second end time of a loading by the second application, and transmitting, via the network, a second log comprising the second start time and the second end time to the server.

In some embodiments, the first start time may include a second start time for loading a first page by the first application, and the first end time may include a second end time for loading the first page by the first application. The process may also include determining a third start time for loading a second page by the first application, and determining a third end time for loading the second page by the first application. The first log may further include the third start time and the third end time.

In some embodiments, determining the third start time for loading the second page may include automatically opening the second page after having loaded the first page. In some embodiments, the process may also include accessing a plurality of rules specifying the first trigger event and the second trigger event. In some embodiments, accessing the plurality of rules may include receiving the plurality of rules from the server. In some embodiments, the loading time may include at least one of a network time, a parsing time, a dispatch time, a binding time, or a loading time of one or more images. In some embodiments, the first trigger event may include an input by a user associated with the user device. In some embodiments, the first trigger event may include an invocation of a startup logic of the first application. In some embodiments, the second trigger event may be that a loading of a webpage or an application page has completed. In some embodiments, the second trigger event may be that a loading of an image has completed. In some embodiments, the second trigger event may include that a loading of a predetermined portion of a page has completed.

In another aspect of the present disclosure, a computer-implemented system for determining a loading time by an application may include a memory storing instructions and at least one processor configured to execute the instructions to perform a process. The process may include receiving, from a user device via a network, a first log comprising a first start time of a loading of a first page by a first application and a first end time of the loading of the first page by the first application. The first start time may be determined in response to a first trigger event detected by the user device, and the first end time may be determined in response to a second trigger event detected by the user device. The process may also include determining a first loading time based on the first start time and the first end time and comparing the first loading time with a reference loading time of the first page by a second application. The process may further include generating a report indicating a loading efficiency of the first application based on the comparison.

In some embodiments, the process may also include generating a report based on the first loading time and the reference loading time. In some embodiments, the process may include receiving, from the user device, a second log, which may include a second start time of a loading of the first page by a second application and a second end time of the loading of the first page by the second application. The process may also include determining the reference loading time based on the second start time and the second end time.

In some embodiments, the process may also include receiving, from each of a plurality of user devices, a first log comprising a start time of loading the first page by the first application and an end time of loading the first page by the first application; receiving, from the each of a plurality of user devices, a second log comprising a start time of loading the first page by a second application and an end time of loading the first page by the second application; and generating a report based on the first logs and the second logs. In some embodiments, the plurality of user devices may have a same hardware configuration.

In some embodiments, the process may also include receiving, from the user device, a second log comprising a second start time of a loading of a second page by the first application and a second end time of the loading of the second page by the first application; and generating a report based on the first log and the second log.

In some embodiments, the process may also include receiving, from each of a plurality of user devices, a first log comprising a start time of loading the first page by the first application and an end time of loading the first page by the first application; receiving, from the each of a plurality of user devices, a second log comprising a start time of loading a second page by a second application and an end time of loading the first page by the second application; and generating a report based on the first logs and the second logs.

In yet another aspect of the present disclosure, a non-transitory computer-readable medium may include instructions that when executed by at least one processor, may be configured to cause a system to perform a process. The process may include detecting a first trigger event and determining a first start time of a loading by a first application in response to the detected first trigger event. The process may also include detecting a second trigger event and determining a first end time of the loading by the first application in response to the detected second trigger event. The process may further include detecting a third trigger event and determining a second start time of a loading by a second application in response to the detected first trigger event. The process may also include detecting a fourth trigger event and determining a second end time of the loading by the second application in response to the detected fourth trigger event. The process may further include transmitting, via a network, a log comprising the first start time, the first end time, the second start time, and the second end time to a server.

Other systems, methods, and computer-readable media are also discussed herein.

DETAILED DESCRIPTION

Figure 1:
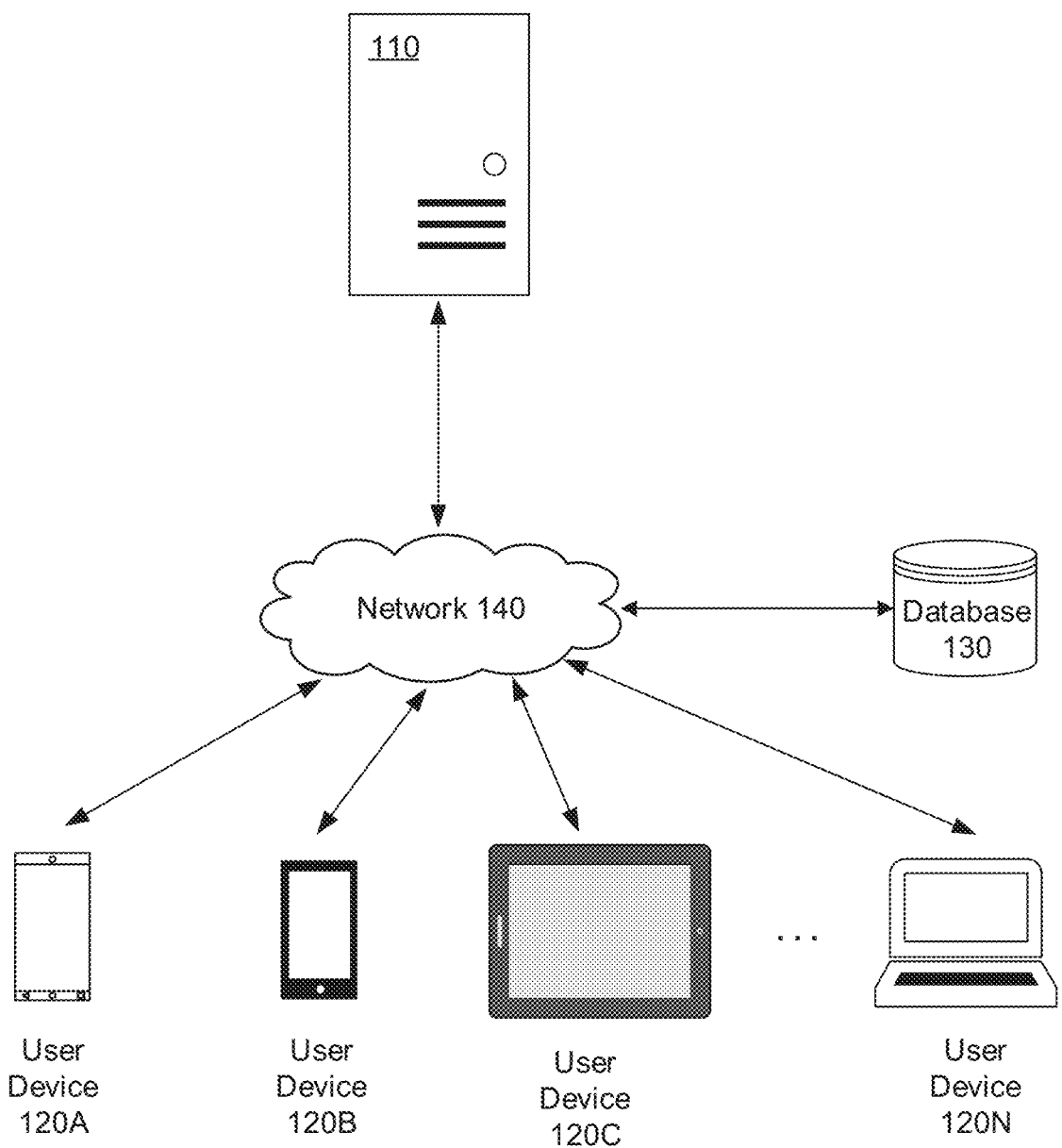
FIG. 1 is a schematic block diagram illustrating an exemplary system for logging loading times, consistent with disclosed embodiments.

The disclosure is generally directed to automated systems and methods for logging loading times of one or more applications run on one or more user devices.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 is a schematic block diagram illustrating an exemplary system 100 for logging loading times, consistent with disclosed embodiments. As illustrated in FIG. 1, system 100 may include a server 110, user devices 120 (e.g., user devices 120-A, 120-B, 120-C, ..., 120-N), database 130, and network 140. User device 120 may be configured to log loading times by one or more applications. User device 120 may also be configured to transmit one or more logs including the loading times to server 110 via, for example, network 140. Server 110 may be configured to compare the loading times with one or more reference times and generate a report based on the comparison. Database 130 may be configured to store information for the components of system 100 (e.g., server 110, user devices 120). Network 140 may be configured to facilitate communications among the components of system 100.

Server 110 may be configured to receive, from one or more user devices 120, one or more logs relating to a loading time of a first application via, for example, network 140. Server 110 may also be configured to determine the loading time of the first application based on the received log and compare the loading time of the first application with a reference loading time (e.g., a loading time of a second application). Server 110 may further be configured to generate a report including a loading efficiency (or a performance) of the first application based on the comparison.

In some embodiments, server 110 may be a cloud server that performs the functions disclosed herein. The term "cloud server" refers to a computer platform that provides services via a network, such as the Internet. In this example configuration, server 110 may use virtual machines that may not correspond to individual hardware. For example, computational and/or storage capabilities may be implemented by allocating appropriate portions of desirable computation/storage power from a scalable repository, such as a data center or a distributed computing environment. In one example, server 110 may implement the methods described herein using customized hard-wired logic, one or more Application Specific Integrated Circuits (ASICs) or Field Programmable Gate Arrays (FPGAs), firmware, and/or program logic which, in combination with the computer system, cause server 110 to be a special-purpose machine.

User device 120 (e.g., one of user devices 120A-120N) may be configured to record the start time and the end time of a loading of one or more applications. For example, user device 120 may be configured to detect an invocation of a startup logic of a first application as a trigger event for recording the start time of the loading of the first application. User device 120 may also be configured to determine the start time. User device 120 may further be configured to detect a trigger event for recording the end time of the loading of the application (e.g., the application has completed the loading of an application page). User device 120 may also be configured to generate a log including the start time and the end time and transmit the log to server 110. User device 120 may further be configured to upload the generated log(s) to server 110 via network 140.

Database 130 may store information and data for the components of system 100 (e.g., server 110, user devices 120). In some embodiments, server 110 and user devices 120 may be configured to access database 130, and obtain data stored from and/or upload data to database 130 via network 140. In some embodiments, database 130 may be configured to store datasets and/or one or more dataset indexes, consistent with disclosed embodiments. Database 130 may include a cloud-based database (e.g., Amazon Relational Database Service (RDS)) or an on-premises database. Database 130 may include view configuration data, expression data, datasets, model data (e.g., model parameters, training criteria, performance metrics, etc.), and/or other data, consistent with disclosed embodiments.

Network 140 may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 140 may be connected to other networks (not depicted in FIG. 1) to connect the various system components to each other and/or to external systems or devices. In some embodiments, network 140 may be a secure network and require a password to access the network.

Figure 2:
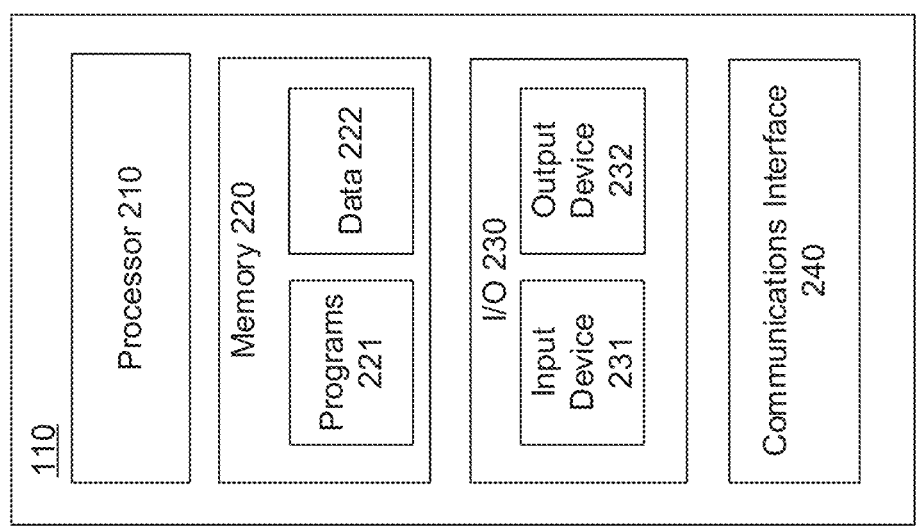
FIG. 2 is a schematic block diagram illustrating an exemplary server, consistent with disclosed embodiments.

FIG. 2 is a schematic block diagram illustrating an exemplary server 110, consistent with disclosed embodiments. As illustrated in FIG. 2, server 110 may include a processor 210, a memory 220, an I/O system 230, and a communications interface 240.

Processor 210 may be configured to perform (or cause server 110 to perform) the functions of server 110 described in this disclosure. Processor 210 may include one or more dedicated processing units, application-specific integrated circuits (ASICs), field-programmable gate arrays (FPGAs), graphical processing units, or various other types of processors or processing units coupled with memory 220. Processor 210 may constitute a single-core or multiple-core processor that executes parallel processes simultaneously. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 210 may execute various instructions stored in memory 220 to perform various functions of the disclosed embodiments described in greater detail below. Processor 210 may be configured to execute functions written in one or more known programming languages.

Memory 220 may be configured to store instructions to be executed by processor 210 to perform functions disclosed herein. Memory 220 may be a single memory component, or multiple memory components. Such memory components may include an electronic storage device, a magnetic storage device, an optical storage device, an electromagnetic storage device, a semiconductor storage device, or any suitable combination of the foregoing. For example, memory 220 may include any number of hard disks, random access memories (RAMs), read-only memories (ROMs), erasable programmable read-only memories (EPROMs or Flash memories), and the like. Memory 220 may include one or more storage devices configured to store instructions usable by processor 210 to perform functions related to the disclosed embodiments. Memory 220 may also include any number of programs, applications, application program interfaces (APIs), or any other data, consistent with the disclosed embodiments. In some embodiments, memory 220 may store programs 106, which may include one or more programs (e.g., APIs, processes, modules, code, scripts, or functions) used to perform methods consistent with disclosed embodiments. Programs 221 may be written in one or more programming or scripting languages. Memory 220 may also maintain data 222, which may include data associated with a user account, an application, a web page, an application page, a particular device, a model, a communication, or any other data related to generating a user interface layer. Data 222 may be exchanged between the components of system 100 (e.g., user devices 120) in accordance with any number of formats or protocols, including XML, REST, SOAP, JSON, GraphQL, and the like.

In some embodiments, memory 220 may include a model (not shown), which may be a machine learning model for analyzing loading times, consistent with disclosed embodiments. For example, server 110 may obtain a model stored in memory 220 and input the log(s) received from user device(s) 120 (or data extracted from the log(s)) into the model to determine the loading efficiency of one or more applications. By way of example, server 110 may input the loading times of various application pages by an application into the model, which may output a score indicating the loading efficiency of the application based on the loading times. A model may be, without limitation, any one of a computer software module, an algorithm, a machine-learning model, a data model, a statistical model, a recurrent neural network (RNN) model, a long-short term memory (LSTM) model, or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After this interaction, the model may be updated to reflect the user interactions and/or machine inputs.

I/O system 230 may be configured to receive input from a user of server 110 and present information to the user. For example, I/O system 230 may present to the user a report relating to loading times logged from one or more user device 120 generated by processor 210 (by, for example, displaying the report on a screen). I/O system 230 may include an input device 231, which may include at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like, or a combination thereof. As will be appreciated by one of skill in the art, input device 231 may be any device capable of receiving inputs, including user inputs, to perform or assist in performing methods consistent with disclosed embodiments. I/O system 230 may also include an output device 232, which may include any device configured to provide data and information to the user. Output device 232 may include a visual display, an LED, a speaker, a haptic feedback device, a printer, or the like, or a combination thereof.

Communications interface 240 may be configured to transmit and receive data with other components of system 100 (e.g., user device 120, database 130) via network 140. For example, communications interface 240 may be configured to receive from user device 120 a log including loading times by an application. Communication interface 240 may also transmit the log (or portion thereof) to processor 210 for further processing.

Figure 3:
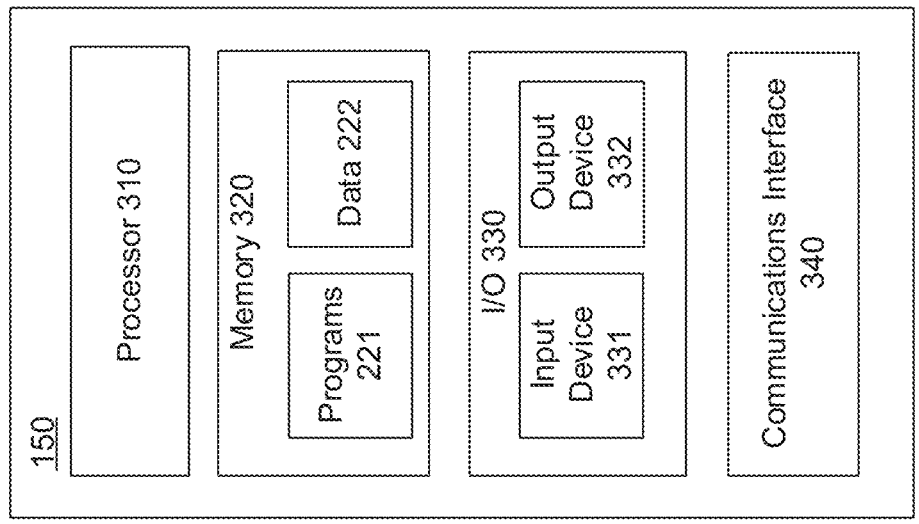
FIG. 3 is a schematic block diagram illustrating a user device, consistent with disclosed embodiments.

FIG. 3 is a schematic block diagram illustrating an exemplary user device 120, consistent with disclosed embodiments. As illustrated in FIG. 3, user device 120 may include a processor 310, a memory 320, an I/O system 330, and a communications interface 340.

Processor 310 may be configured to perform (or cause user device 120 to perform) the functions of user device 120 described in this disclosure. Processor 310 may include one or more dedicated processing units, application-specific integrated circuits (ASICs), field-programmable gate arrays (FPGAs), graphical processing units, or various other types of processors or processing units coupled with memory 320. Processor 310 may constitute a single-core or multiple-core processor that executes parallel processes simultaneously. For example, processor 310 may be a single-core processor configured with virtual processing technologies. In some embodiments, processor 310 may use logical processors to simultaneously execute and control multiple processes. Processor 310 may implement virtual machine technologies, or other known technologies to provide the ability to execute, control, run, manipulate, store, etc., multiple software processes, applications, programs, etc. In another embodiment, processor 310 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 310 may execute various instructions stored in memory 320 to perform various functions of the disclosed embodiments described in greater detail below. Processor 310 may be configured to execute functions written in one or more known programming languages.

Memory 320 may be configured to store instructions to be executed by processor 310 to perform functions disclosed herein. Memory 320 may be a single memory component, or multiple memory components. Such memory components may include an electronic storage device, a magnetic storage device, an optical storage device, an electromagnetic storage device, a semiconductor storage device, or any suitable combination of the foregoing. For example, memory 320 may include any number of hard disks, random access memories (RAMs), read-only memories (ROMs), erasable programmable read-only memories (EPROMs or Flash memories), and the like. Memory 320 may include one or more storage devices configured to store instructions usable by processor 310 to perform functions related to the disclosed embodiments. Memory 320 may also include any number of programs, applications, application program interfaces (APIs), or any other data, consistent with the disclosed embodiments. In some embodiments, memory 320 may store programs 106, which may include one or more programs (e.g., APIs, processes, modules, code, scripts, or functions) used to perform methods consistent with disclosed embodiments. Programs 321 may be written in one or more programming or scripting languages. Memory 320 may also maintain data 322, which may include data associated with a user account, an application, a web page, an application page, a particular device, a model, a communication, or any other data related to generating a user interface layer. Data 322 may be exchanged between the components of system 100 (e.g., server 110) in accordance with any number of formats or protocols, including XML, REST, SOAP, JSON, GraphQL, and the like.

In some embodiments, memory 320 may include a model (not shown), which may be a machine learning model for analyzing loading times, consistent with disclosed embodiments. For example, user device 120 may obtain a model stored in memory 320 and input the loading times into the model to determine the loading efficiency of one or more applications. By way of example, user device 120 may input the loading times of various application pages by an application into the model, which may output a score indicating the loading efficiency of the application based on the loading times. A model may be, without limitation, any one of a computer software module, an algorithm, a machine-learning model, a data model, a statistical model, a recurrent neural network (RNN) model, a long-short term memory (LSTM) model, or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After this interaction, the model may be updated to reflect the user interactions and/or machine inputs.

I/O system 330 may be configured to receive input from a user of user device 120 and present information to the user. For example, I/O system 330 may receive input from the user to initiate a loading of an application. I/O system 330 may include an input device 331, which may include at least one of a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, or the like, or a combination thereof. As will be appreciated by one of skill in the art, input device 331 may be any device capable of receiving inputs, including user inputs, to perform or assist in performing methods consistent with disclosed embodiments. I/O system 330 may also include an output device 332, which may include any device configured to provide data and information to the user. Output device 332 may include a visual display, an LED, a speaker, a haptic feedback device, or the like, or a combination thereof.

Communications interface 340 may be configured to transmit and receive data with other components of system 100 (e.g., server 110, database 130) via network 140. For example, communications interface 340 may be configured to transmit to server 110 a log including loading times by an application.

In some embodiments, user device 150 may include one or more sensors (not shown), such as an accelerometer, a light sensor, an audio sensor, an infrared sensor, a motion sensor, a piezoelectric sensor, a laser sensor, a sonar sensor, a GPS sensor, an electromagnetic sensor, and the like.

In some embodiments, at least two user devices 120 may have the same hardware and/or software configuration. For example, two user devices 120 may include the same processor, same memory, and/or same operating systems. Alternatively or additionally, at least two user devices 120 may have different hardware and/or software configurations. For example, user device 120A and user device 120B may have the same hardware components (e.g., the same processors), but have different operating systems (or different versions of an operating system). For example, user device 120A may operate on ANDROID 10, while user device 120A may operate on ANDROID 11 (or a WINDOWS operating system).

As described elsewhere in this disclosure, some embodiments, server 110 (and/or user device 120) may determine a loading time of an application by determining the start time of the loading and the end time of the loading. For example, user device 120 may transmit to server 110 a first log, which may include a first start time for loading a first application and a first end time for loading the first application, and a second log, which may include a second start time for loading a second application and a second end time for loading the second application. One skilled in the art would understand that a "second application" used herein may be an application different from a "first application" or a version of the "same" application from the "first application." For example, the first application may operate on an ANDROID operating system, and the second application may operate on an IOS operating system. As another example, the first application may be an earlier version of an application (e.g, App A version 3.0) than the second application (e.g., App A version 3.1).

Figure 4A:
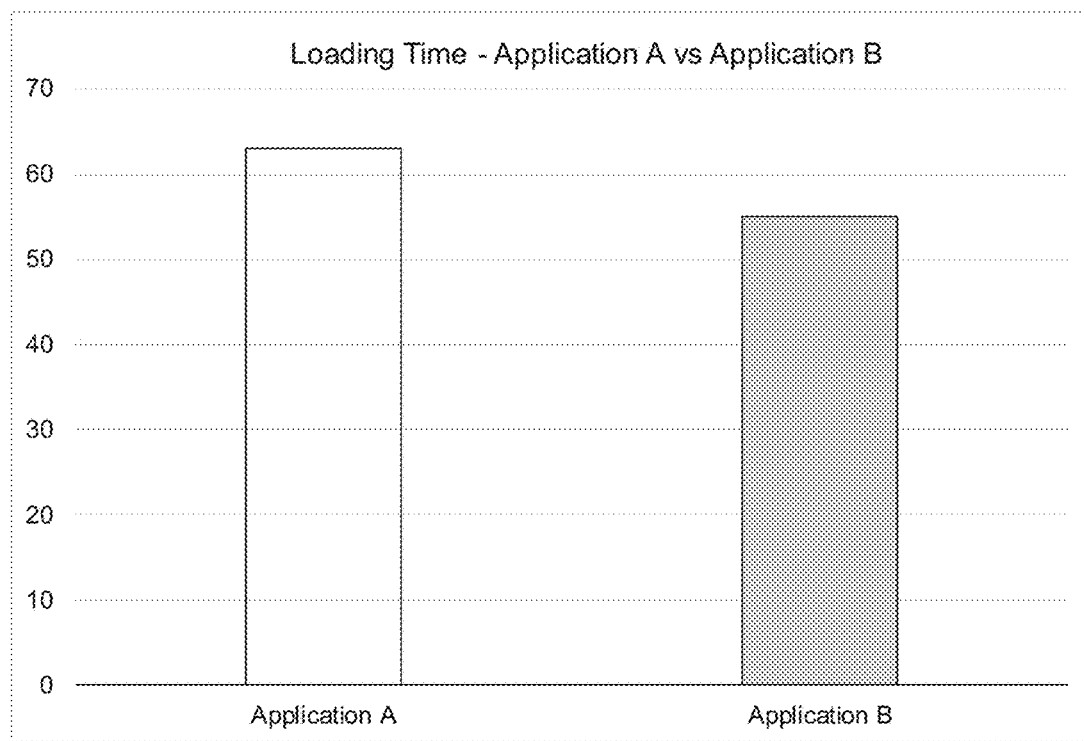
FIGS. 4A and 4B are diagrams illustrating exemplary loading times, consistent with disclosed embodiments.
Figure 4B:
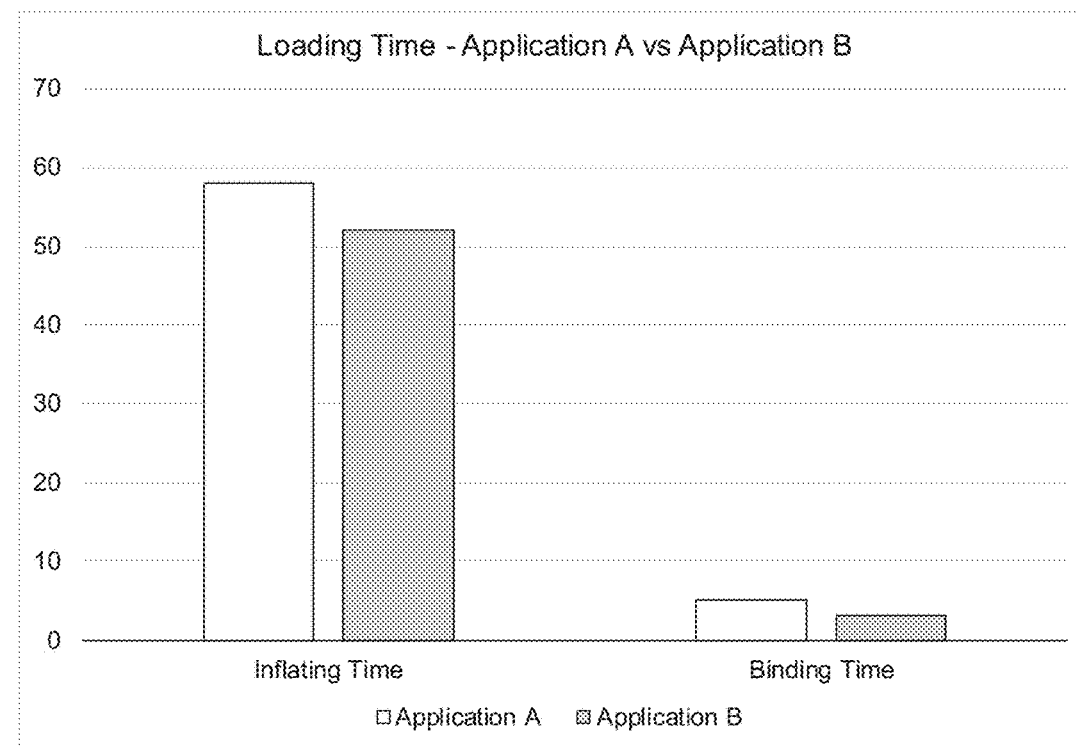

Server 110 may determine the first loading time relating to the first application based on the first start time and the first end time (by, for example, subtracting the first start time from the first end time). Server 110 may also determine the second loading time based on the second start time and the second end time (by, for example, subtracting the second start time from the second end time). FIGS. 4A and 4B are diagrams illustrating exemplary loading times, consistent with disclosed embodiments. Server 110 may compare the first loading time of the first application with the second loading time of the second application. Server 110 may also evaluate the first and second applications based on the comparison of the first and second loading times. For example, server 110 may determine that the first loading time is longer than the second loading time. Server 110 may also determine a score for the first loading time that is lower than a score for the second application. In some embodiments, server 110 may also present to the user the first loading time for the first application (e.g., 62 ms shown in FIG. 4A) and the second loading time for the second application (e.g., 55 ms shown in FIG. 4A). Alternatively or additionally, server 110 may present a breakdown of a loading time. For example, a loading time for an application recorded at user device 120 may include an inflating time and a banding time. Server 110 may receive from a first log relating to a first application including a first inflating time and a first banding time, and a second log relating to a second application including a second inflating time and a second banding time. Server 110 may also present to the user the first inflating time, the first banding time, the second inflating time, and the second banding time, as shown in FIG. 4B.

Figure 5:
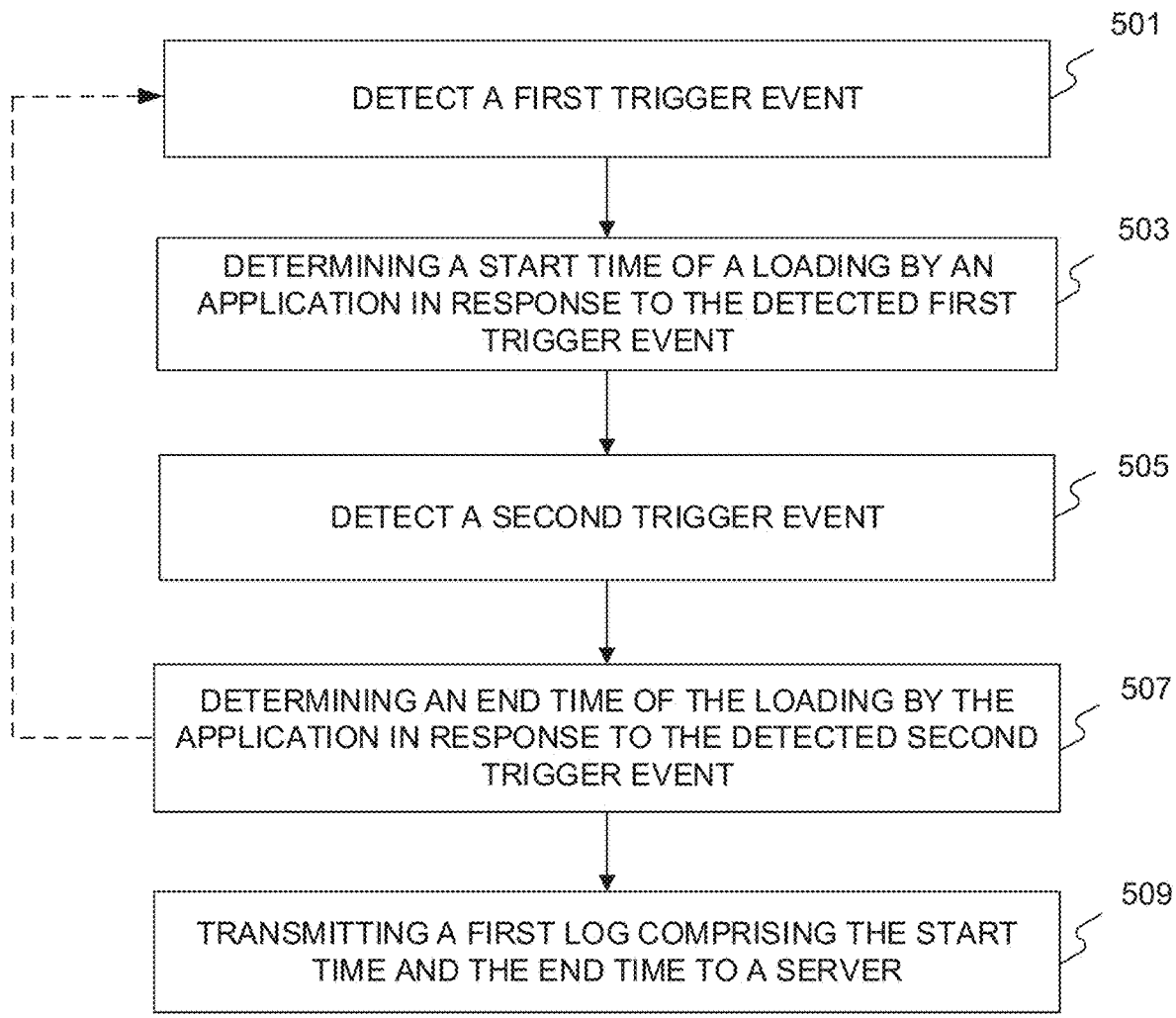
FIG. 5 is a flowchart illustrating an exemplary process for logging loading times, consistent with disclosed embodiments.

FIG. 5 is a flowchart illustrating an exemplary process 500 for logging a loading time by one or more applications, consistent with disclosed embodiments.

At step 501, processor 310 may be configured to detect a first trigger event. The first trigger event may include an input by a user associated with the user device. For example, the user may click an icon to open a first application. As another example, the user may click an icon or text in an application to open a web page or application page. Processor 310 may receive the input and detect it as a first trigger event. Alternatively or additionally, the first trigger event may include an invocation of a startup logic of the first application, a function called by the first application, a loading of a web page or an application (or a predetermined portion thereof), a loading of one or more images, or the like, or a combination thereof. For example, processor 310 may detect invocation of ANDROID "onCreate" function as a first trigger event.

In some embodiments, processor 310 may access a plurality of rules specifying the first trigger event (and/or the second trigger event described below). Processor 310 may detect a first trigger event based on the rules. The rules may also include information relating to one or more triggers, types of loading times (e.g., a network time, a parsing time, a dispatch time, a binding time, or a loading time of one or more images, or the like, or a combination thereof) to be recorded. In some embodiments, processor 310 may receive the rules from server 110.

At step 503, processor 310 may be configured to determine a first start time of a loading by a first application in response to the detected first trigger event. For example, processor 310 may determine the time point when the first trigger event is detected as a first start time. Alternatively or additionally, processor 310 may start recording a loading time.

At step 505, processor 310 may be configured to detect a second trigger event. The second trigger event may be that a loading is completed. For example, the loading to be recorded may include a loading of an application page by the first application. The second trigger event may be that the loading of the application page is completed. Processor 310 may determine that the loading of the application page is completed and detect the completion of the loading of the application page as the second trigger event. As another example, the second trigger event may be that a loading of an image or a loading of a predetermined portion of a page (e.g., a web page or an application) has completed.

At step 507, processor 310 may be configured to determine a first end time of the loading by the first application in response to the detected second trigger event. For example, processor 310 may determine the time point when the second trigger event is detected as a first end time. Alternatively or additionally, if processor 310 start a recording a loading time at step 503, processor 310 may stop the recording of the loading time.

In some embodiments, the loading time to be recorded may include a plurality of sub-loading times. For example, the loading time may include two or more of a network time, an inflating time, a parsing time, a dispatch time, a binding time, and a loading time of one or more images. More details are provided below in connection with FIG. 7. By way of example, processor 310 may determine a start time of an inflating time at step 503 and determine an end time of the inflating time at step 507 (as described above). Process 500 may proceed to step 501 and repeat steps 501 to 507 to determine the start time of the loading of an image and the end time of the loading of the image.

In some embodiments, processor 310 may also determine a second start time of a loading by a second application and determine a second end time of a loading by the second application by repeating steps 501 to 507. For example, processor 310 may determine the first start time of the loading of an application page by the first application and the first end time of the loading of the application page by the first application. Processor 310 may also determine the second start time of the loading of the same application page by the second application and the second end time of the loading of the application page by the second application.

Figure 7:
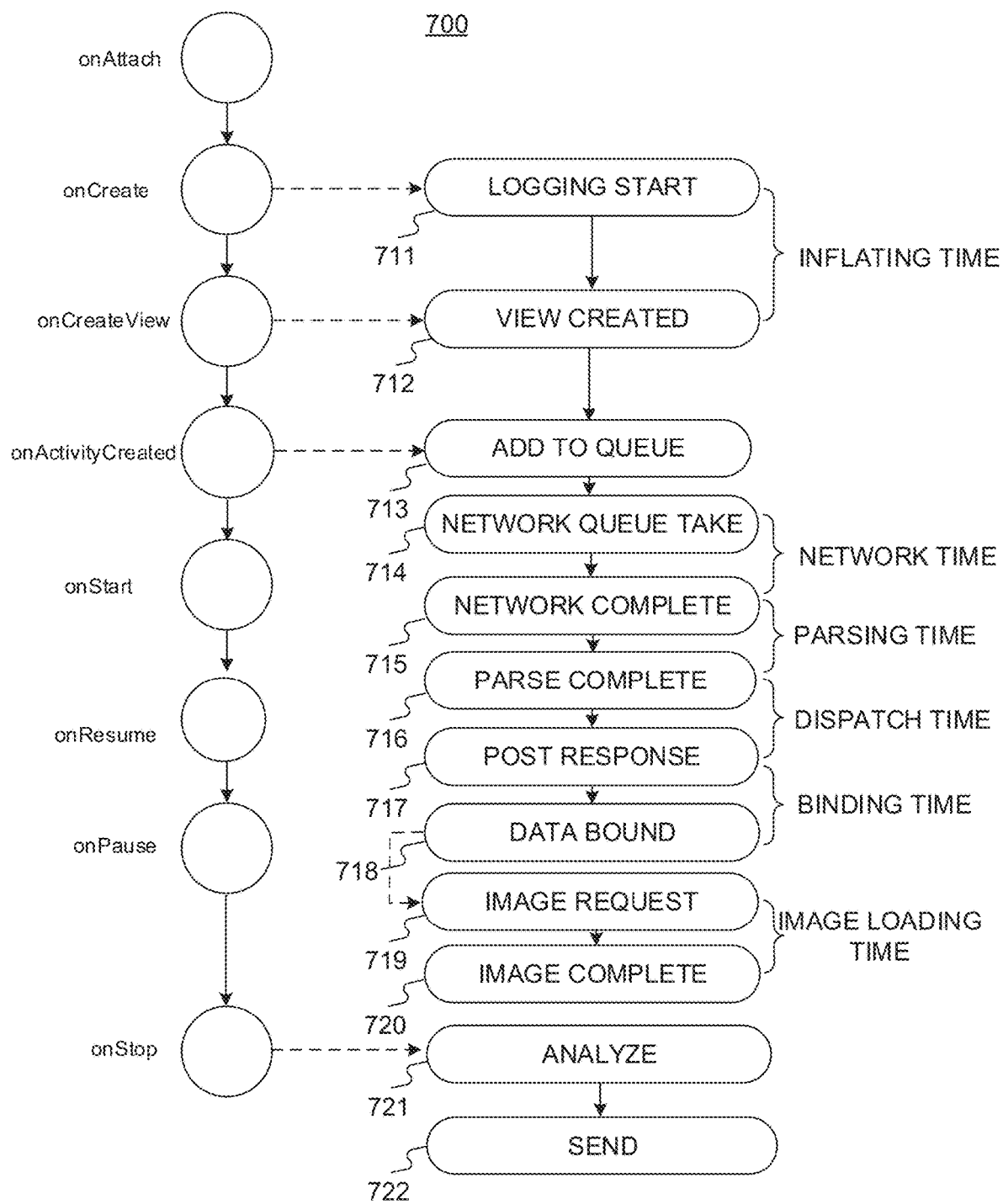
FIG. 7 is a flowchart illustrating an exemplary process for generating a report of loading times, consistent with disclosed embodiments.

In some embodiments, processor 310 may further detect an event indicating that the sub-loadings by the application(s) have completed and may cause process 500 to proceed to step 509. For example, as illustrated in FIG. 7, processor 310 may detect an event that the loading of an image has completed (i.e., at step 720 of process 700) and determine that all the sub-loadings (e.g., inflating, networking, parsing, dispatching, binding, and image loading) have completed. Processor 310 may also generate a log including the loading times relating to the sub-loadings, and process 500 may proceed to step 509.

Referring to FIG. 5, at step 509, processor 310 may be configured to transmit, via a network, a first log including the first start time and the first end time to a server. For example, processor 310 may transmit a first log including the first start time of the loading of an application page and the first end time of the loading of the application page to server 110. Alternatively or additionally, the first log may include the recorded time of the loading.

In some embodiments, the first log may include the first start time of the loading of an application page by the first application, the first end time of the loading of the application page by the first application, the second start time of the loading of the same application page by the second application, and the second end time of the loading of the application page by the second application. Alternatively, the first log may include the first start time of the loading of an application page by the first application and the first end time of the loading of the application page by the first application, and a second log may include the second start time of the loading of the same application page by the second application and the second end time of the loading of the application page by the second application. Processor 310 may transmit the first log and the second log to server 110.

In some embodiments, the first log may include the first start time of the loading of a first page by the first application, the first end time of the loading of the first page by the first application, the second start time of the loading of a second page by the first application, and the second end time of the loading of the second page by the first application. Processor 310 may be configured to transmit the first log to server 110. Alternatively, the first log may include the first start time of the loading of a first page by the first application and the first end time of the loading of the first page by the first application, and the second log may include the second start time of the loading of a second page by the first application and the second end time of the loading of the second page by the first application. Processor 310 may transmit the first log and the second log to server 110.

In some embodiments, processor 310 may determine the first start time of the loading of a first page by the first application and the first end time of the loading of the first page by the first application. Processor 310 may also determine the second start time of the loading of a second page by the first application and the second end time of the loading of the second page by the first application.

Figure 6:
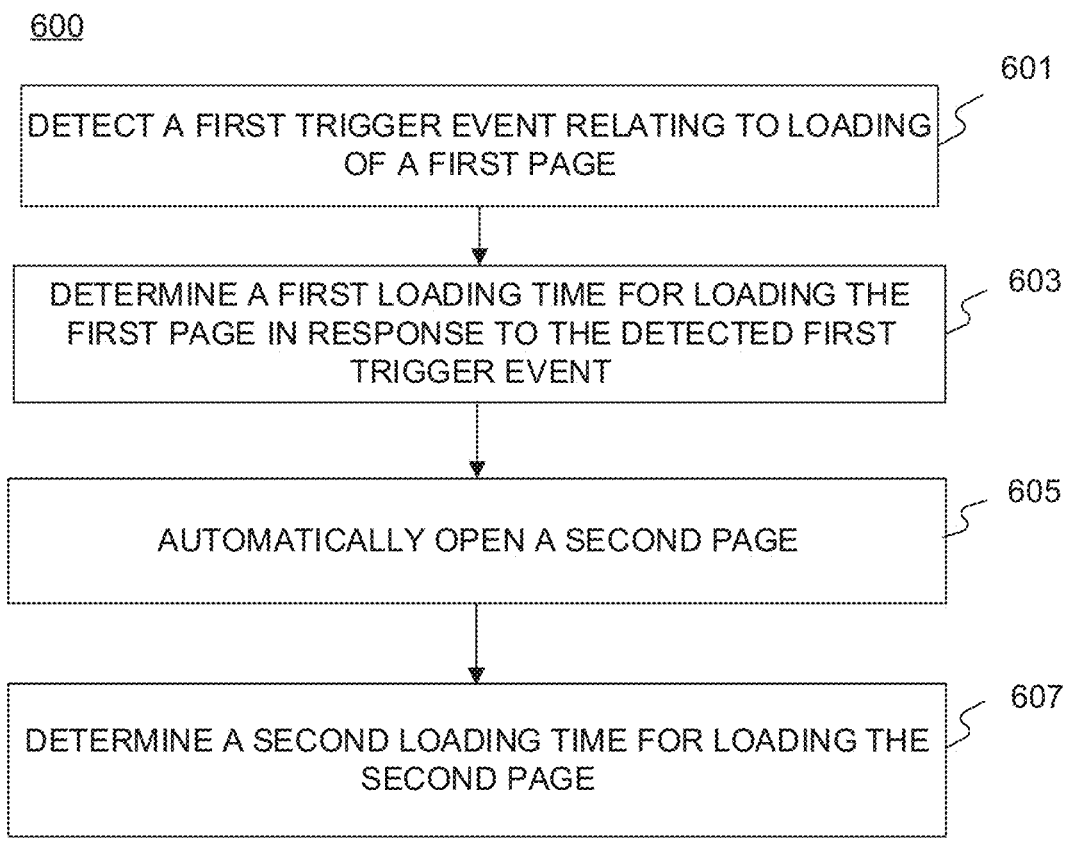
FIG. 6 is a flowchart illustrating an exemplary process for logging loading times, consistent with disclosed embodiments.

FIG. 6 is a flowchart illustrating an exemplary process 600 for logging the times for loading a plurality of pages (e.g., web pages, application pages, etc.), consistent with disclosed embodiments.

At step 601, processor 310 may detect a first trigger event relating to the loading of a first page by the application (similar to step 501 of process 500 illustrated in FIG. 5). For example, processor 310 may detect an invocation of a startup logic of the application, which may indicate the loading of a first application page. The invocation of the startup logic may be initiated by processor 310 or an input from the user.

At step 603, processor 310 may determine a first loading time for loading the first page in response to the detected first trigger event (similar to steps 503-507 of process 500 illustrated in FIG. 5). For example, processor 310 may determine the first start time of the loading of the first page by the application and the first end time of the loading of the first page by the application.

At step 605, processor 310 may automatically open or cause the application to open a second page. For example, processor 310 may cause the application to load a second application page.

At step 607, processor 310 may determine a second loading time for loading the second page (similar to steps 503-507 of process 500 illustrated in FIG. 5). For example, processor 310 may determine the second start time of the loading of the second page by the application and the second end time of the loading of the second page by the application.

In some embodiments, processor 310 may repeat steps 605 and 607 until all pages to be tested have been loaded and determine the loading times relating to these pages as described elsewhere in this disclosure.

Processor 310 may also generate a log including the loading times recorded and transmit the log to server 110.

FIG. 7 is a flowchart illustrating an exemplary process 700 for logging loading times, consistent with disclosed embodiments. While process 700 is illustrated using exemplary ANDROID functions, one skilled in the art would understand that process 700 may be implemented with other methods. As illustrated in FIG. 7, the loading of a page (e.g., a web page) by an application may include various steps, such as inflating, accessing a network, parsing, dispatching, binding, image loading, etc. An application may start the loading by revoking a function, including, for example, calling an onAttach function and an onCreate function. The revocation by the application may be detected by processor 310 as a trigger for logging a loading time at step 711. Processor 310 may also record a start time of the loading or inflating time of, for example, inflating, an XML file (as described elsewhere in this disclosure).

At step 712, processor 310 may determine that a view has been created and inflated, and detect the completion of the view as a trigger for recording the end time of the inflating time. In some embodiments, the time period between steps 711 and 712 may include an inflating time.

At step 713, processor 310 may add accessing the network by the application to a network queue, which may correspond to a command or function (e.g., onCreateView function illustrated in FIG. 7).

At step 714, processor 310 may detect a trigger event for logging the network time and determine the start time of the network time. At step 715, processor 310 may determine the network time is completed (i.e., a trigger event) and determine the end time of the network time (and the start time of a parsing time of, for example, parsing an XML file).

At step 716, processor 310 may determine that the parsing is completed and determine the end time of the parsing time (and the start time of a dispatch time of, for example, dispatching an activity).

At step 717, processor 310 may determine that the dispatch time is completed and determine the end time of the dispatch time (and the start time of a binding time).

At step 718, processor 310 may determine that the binding time is completed.

At step 719, processor 310 may detect a request for loading at least one image as a trigger event for recording a loading time of the image and determine the start time of the image loading time.

At step 720, processor 310 may determine that the image has been loaded and determine the end time of the image loading time.

At step 721, processor 310 may collect the times determined in the previous steps and analyze the collected times. For example, processor 310 may determine at least one of an inflating time, a network time, a parsing time, a dispatch time, a binding time, and an image loading time. Processor 310 may also generate a log including the times recorded (and/or the loading times determined).

At step 722, processor 310 may transmit the log to server 110 as described elsewhere in this disclosure.

One skilled in the art would understand that one or steps of process 700 may be omitted. For example, if no images are not requested during the loading, steps 719 and 720 may be omitted.

Figure 8:
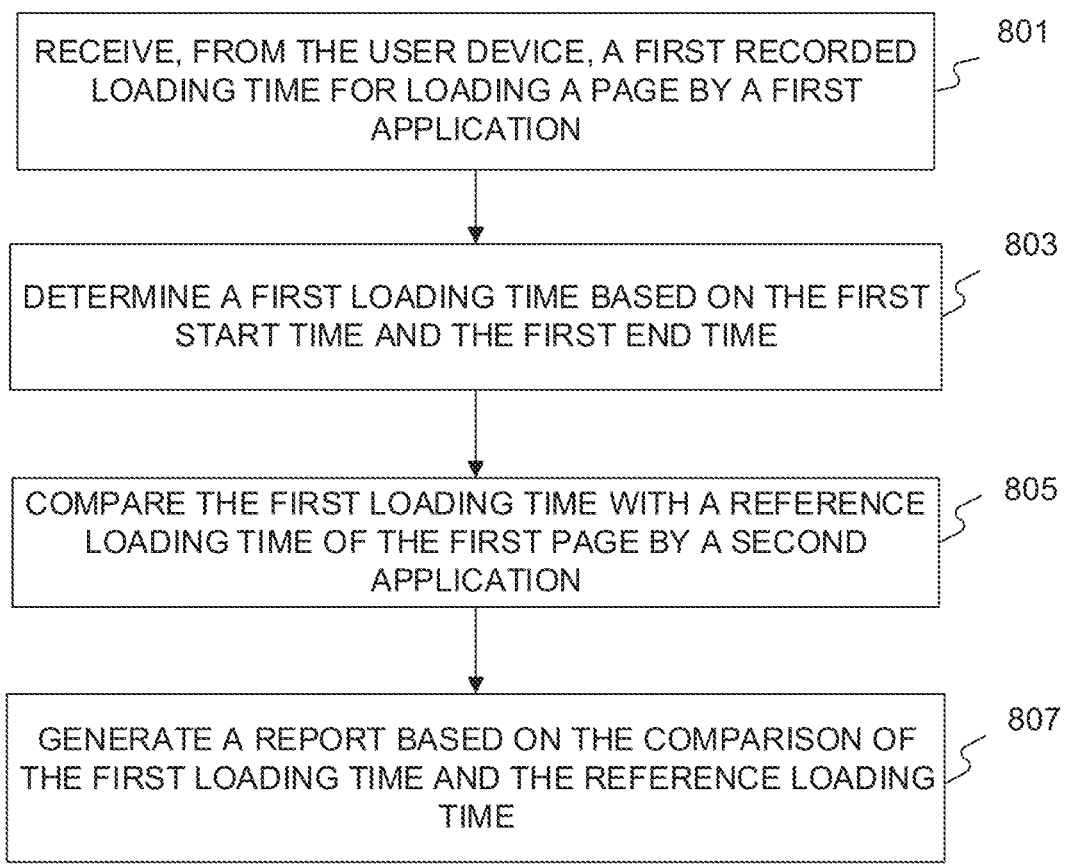
FIG. 8 is a flowchart illustrating an exemplary process for logging loading times, consistent with disclosed embodiments.

FIG. 8 is a flowchart illustrating an exemplary process for generating a report of loading times, consistent with disclosed embodiments. At step 801, server 110 (e.g., through processor 210) may be configured to receive, from a user device 120 via network 140, a first log (or other exemplary logs) generated as described elsewhere in this disclosure. For example, the first log may include a first start time of a loading of a first page by a first application (which may be determined in response to a first trigger event detected by user device 120) and a first end time of the loading of the first page by the first application (which may be determined in response to a first trigger event detected by user device 120), which may be generated by user device 120 based on process 500 described above. Processor 210 may receive from user device 120 the first log.

At step 803, processor 210 may be configured to determine a first loading time based on the first start time and the first end time. For example, processor 210 may determine the first loading time by subtracting the first start time from the first end time. In some embodiments, the first log may include the first loading time (which may be generated by user device 120), and processor 210 may obtain the first loading time from the first log.

At step 805, processor 210 may be configured to compare the first loading time with a reference loading time of the first page by a second application. For example, processor 210 may obtain a reference loading time of the first page by a second application from memory 220 or database 130 and compare the first loading time with the reference loading time.

In some embodiments, the reference loading time may be determined based on recorded time points relating to a loading of the first page by the application at the user device 120 that generates the first log. For example, user device 120 may also determine a second log including a second start time of a loading of the first page by the second application and a second end time of the loading of the first page by the second application. Server 110 may receive the second log from user device 120 and determine the reference loading time based on the second start time and the second end time.

In some embodiments, the reference loading time may be determined based on loading times determined according to data from a plurality of user devices 120 (by, for example, determining an average loading time as the reference loading time).

At step 807, processor 210 may be configured to generate a report indicating a loading efficiency (or a performance) of the first application (and/or the second application) based on the comparison. For example, processor 210 may determine that the first loading time is shorter than the reference loading time. Processor 210 may also assign a score indicating a higher loading efficiency to the first application (and/or assign a score indicating a lower loading efficiency to the second application). Processor 210 may further generate a report including the determined score for the application. In some embodiments, the report may also include other information, such as information relating to the first application, the first loading time, user device 120, the first page, the second application, the reference loading time, etc. In some embodiments, processor 210 may present the generated report to the user of server 110 (e.g., by displaying the information on a display). In some embodiments, if the difference between the loading times of the first application and the second application (e.g., the loading time of the first application is 50 ms longer than the loading time of the second application) is higher than a threshold, processor 210 may generate a notification indicating the difference. Alternatively or additionally, processor 210 may flag the first application (and/or the second application) in the report and/or a deployment system.

In some embodiments, processor 210 may receive a first log including a first loading time relating to the loading of the first page by the first application each of from a plurality user devices 120. For example, processor 210 may receive, from each of a plurality of user devices 120, a first log comprising a start time of loading the first page by the first application and an end time of loading the first page by the first application. Processor 210 may also determine an average first loading time based on the received first logs. Alternatively or additionally, processor 210 may receive, from each of a plurality of user devices 120, a second log comprising a start time of loading the first page by a second application and an end time of loading the first page by the second application. Processor 210 may determine a reference loading time based on the received second logs. Processor 210 may also generate a report based on the first logs and the second logs (including, for example, comparing the first loading time with the second loading time).

In some embodiments, processor 210 may receive, from the user device 120, a second log comprising a second start time of a loading of a second page by the first application and a second end time of the loading of the second page by the first application. Processor 210 may also generate a report based on the first log and the second log (including, for example, comparing the first loading time with the second loading time).

In some embodiments, processor 210 may also determine the deployment of the first application (and/or the second application) based on the comparison of the loading times of the first application and the second application. For example, processor 210 may determine that the performance of the first application is better than that of the second application.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer-readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for logging a loading time by one or more applications in a user device, the computer-implemented system comprising:
   a memory storing instructions; and
   at least one processor configured to execute the instructions to perform a process comprising:
      receiving an invocation of a startup logic of a first application;
      detecting a first trigger event in response to receiving the invocation of the startup logic of the first application;
      determining a first start time of a loading by the first application in response to the detected first trigger event;
      completing the loading by the first application;
      detecting a second trigger event in response to completing the loading by the first application;
      determining a first end time of the loading by the first application in response to the detected second trigger event; and
      transmitting, via a network, a first log comprising the first start time and the first end time of the loading by the first application to a server, wherein the first start time and the first end time of the loading by the first application comprises a plurality of sub-loading times of the loading by the first application, and wherein the plurality of sub-loading times of the loading by the first application comprise a first start time and a first end time of a network time, a first start time and a first end time of a parsing time, and a first start time and a first end time of a loading time of one or more images.

2. The computer-implemented system of claim 1, wherein the process further comprises:
   determining a second start time of a loading by a second application;
   determining a second end time of the loading by the second application; and
   transmitting, via the network, a second log comprising the second start time and the second end time of the loading by the second application to the server, wherein the second start time and the second end time of the loading by the second application comprises a plurality of sub-loading times of the loading by the second application, and wherein the plurality of sub-loading times of the loading by the second application comprise a second start time and a second end time of a network time, a second start time and a second end time of a parsing time, and a second start time and a second end time of a loading time of one or more images.

3. The computer-implemented system of claim 1, wherein:
   the first start time of the loading by the first application comprises a second start time for loading a first page by the first application;
   the first end time of the loading by the first application comprises a second end time for loading the first page by the first application; and
   the process further comprises:
      determining a third start time for loading a second page by the first application; and
      determining a third end time for loading the second page by the first application, wherein the first log further comprises the third start time and the third end time for loading the second page by the first application.

4. The computer-implemented system of claim 3, wherein determining the third start time for loading the second page by the first application comprises automatically opening the second page of the first application after having loaded the first page of the first application.

5. The computer-implemented system of claim 1, wherein the process further comprises:
   accessing a plurality of rules specifying the first trigger event and the second trigger event.

6. The computer-implemented system of claim 5, wherein accessing the plurality of rules comprises receiving the plurality of rules from the server.

7. The computer-implemented system of claim 1, wherein the plurality of sub-loading times of the loading by the first application further comprises at least one of a first start time and a first end time of a dispatch time or a first start time and a first end time of a binding time.

8. The computer-implemented system of claim 1, wherein the first trigger event is an input by a user associated with the user device.

9. The computer-implemented system of claim 1, wherein the second trigger event is that a loading of a webpage or an application page has completed.

10. The computer-implemented system of claim 1, wherein the second trigger event is that a loading of an image has completed.

11. The computer-implemented system of claim 1, wherein the second trigger event is that a loading of a predetermined portion of a page has completed.

12. A computer-implemented system for logging a loading time by one or more applications in a user device, the computer-implemented system comprising:
   a memory storing instructions; and
   at least one processor configured to execute the instructions to perform a process comprising:
      receiving, from the user device via a network, a first log comprising a first start time of a loading of a first page by a first application and a first end time of the loading of the first page by the first application, wherein:
         the first start time of the loading of the first page by the first application is determined in response to receiving an invocation of a startup logic of the first application and a first trigger event detected by the user device based on the received invocation of the startup logic of the first application; and
         the first end time of the loading of the first page by the first application is determined in response to completing the loading by the first application and a second trigger event detected by the user device based on completing the loading by the first application;
      determining a first loading time of the first page by the first application based on the first start time and the first end time of the loading of the first page by the first application, wherein the first loading time of the first page by the first application comprises a plurality of sub-loading times of the loading of the first page by the first application, and wherein the plurality of sub-loading times of the loading of the first page by the first application comprise a first start time and a first end time of a network time, a first start time and a first end time of a parsing time, and a first start time and a first end time of a loading time of one or more images;
      comparing the first loading time of the first page by the first application with a reference loading time of the first page by a second application; and
      generating a report indicating a loading efficiency of the first page by the first application based on the comparison.

13. The computer-implemented system of claim 12, wherein the process further comprises:
   generating a report based on the first loading time of the first page by the first application and the reference loading time of the first page by the second application.

14. The computer-implemented system of claim 13, wherein the process further comprises:
   receiving, from the user device via the network, a second log comprising a second start time of a loading of the first page by a second application and a second end time of the loading of the first page by the second application; and
   determining the reference loading time of the first page by the second application based on the second start time and the second end time of the loading of the first page by the second application.

15. The computer-implemented system of claim 12, wherein the process further comprises:
   receiving, from each user device of a plurality of user devices via the network, a first log comprising a first start time of a loading of the first page by the first application and a first end time of the loading of the first page by the first application;
   receiving, from each user device of the plurality of user devices via the network, a second log comprising a second start time of a loading of the first page by a second application and a second end time of the loading of the first page by the second application; and
   generating a report based on the first logs and the second logs received from the plurality of user devices via the network.

16. The computer-implemented system of claim 15, wherein the plurality of user devices have a same hardware configuration.

17. The computer-implemented system of claim 12, wherein the process further comprises:
   receiving, from the user device via the network, a second log comprising a second start time of a loading of a second page by the first application and a second end time of the loading of the second page by the first application; and
   generating a report based on the first log and the second log received from the user device via the network.

18. The computer-implemented system of claim 12, wherein the process further comprises:
   receiving, from each user device of a plurality of user devices via the network, a first log comprising a first start time of a loading of the first page by the first application and a first end time of the loading of the first page by the first application;
   receiving, from each user device of the plurality of user devices via the network, a second log comprising a second start time of a loading of a second page by a second application and a second end time of the loading of the second page by the second application; and
   generating a report based on the first logs and the second logs received from the plurality of user devices via the network.

19. A non-transitory computer-readable medium storing instructions, wherein the instructions, when executed by at least one processor, are configured to cause a system to perform a process comprising:
   receiving an invocation of a startup logic of a first application;
   detecting a first trigger event in response to receiving the invocation of the startup logic of the first application;
   determining a first start time of a loading by the first application in response to the detected first trigger event;
   completing the loading by the first application;
   detecting a second trigger event in response to completing the loading by the first application;
   determining a first end time of the loading by the first application in response to the detected second trigger event;
   receiving an invocation of a startup logic of a second application;
   detecting a third trigger event in response to receiving the invocation of the startup logic of the second application;
   determining a second start time of a loading by the second application in response to the detected third trigger event;

completing the loading by the second application;
detecting a fourth trigger event in response to completing the loading by the second application;
determining a second end time of the loading by the second application in response to the detected fourth trigger event; and
transmitting, via a network, a log comprising the first start time and the first end time of the loading by the first application and the second start time and the second end time of the loading by the second application to a server, wherein the first start time and the first end time of the loading by the first application and the second start time and the second end time of the loading by the second application comprise a plurality of sub-loading times of the loading by the first and second applications, and wherein the plurality of sub-loading times of the loading by the first and second applications comprise a first and second start time and a first and second end time of a network time, a first and second start time and a first and second end time of a parsing time, and a first and second start time and a first and second end time of a loading time of one or more images.

* * * * *